US012672064B2

(12) United States Patent
Zhang

(10) Patent No.: US 12,672,064 B2
(45) Date of Patent: Jun. 30, 2026

(54) METHOD FOR OPERATION OF UWB TAG, UWB TAG, AND STORAGE MEDIUM

(71) Applicant: GUANGDONG OPPO MOBILE TELECOMMUNICATIONS CORP., LTD., Dongguan (CN)

(72) Inventor: Ye Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 395 days.

(21) Appl. No.: 18/469,504

(22) Filed: Sep. 18, 2023

(65) Prior Publication Data

US 2024/0031932 A1     Jan. 25, 2024

Related U.S. Application Data

(63) Continuation of application No. PCT/CN2022/073874, filed on Jan. 25, 2022.

(30) Foreign Application Priority Data

Mar. 19, 2021   (CN) .......................... 202110296068.9
Jul. 6, 2021   (CN) .......................... 202110761474.8

(51) Int. Cl.
*H04W 52/02*        (2009.01)
*H04B 1/7163*        (2011.01)

(52) U.S. Cl.
CPC ...... *H04W 52/0225* (2013.01); *H04B 1/7163* (2013.01)

(58) Field of Classification Search
CPC ......... H04W 52/0225; H04W 52/0229; H04W 52/0245; H04W 52/028; H04W 52/0235; H04W 4/80; H04B 1/7163; G06K 19/0723
See application file for complete search history.

(56) References Cited

U.S. PATENT DOCUMENTS 8,842,792 B2 *   9/2014   Jantunen ............ G06K 7/10306
                                                    375/356
2004/0161064 A1 *   8/2004   Brethour ................ H04B 1/719
                                                    375/347

(Continued)

FOREIGN PATENT DOCUMENTS

CN        1864167        11/2006
CN        102413034        4/2012

(Continued)

OTHER PUBLICATIONS

EPO, Extended European Search Report for EP Application No. 22770203.2, May 14, 2024.

(Continued)

*Primary Examiner* — Robert C Scheibel

(74) *Attorney, Agent, or Firm* — Hodgson Russ LLP

(57) ABSTRACT

A method and an apparatus for operation of an ultra wide band (UWB) tag, a UWB tag, and a storage medium are provided and relate to the field of UWB technology. The method includes the following. A UWB transceiver is controlled to be in a first transceiving state in response to the UWB tag being in a first state, where the first state belongs to a target-state set. The UWB tag is switched to a second state from the first state in response to a state transition event and the UWB transceiver is controlled to be in a second transceiving state, where the second state belongs to the target-state set.

18 Claims, 8 Drawing Sheets

(56) References Cited

U.S. PATENT DOCUMENTS

| 2009/0066516 A1* | 3/2009 | Lazo ................ G06K 19/07749 |
| | | 340/572.7 |
| 2018/0123639 A1* | 5/2018 | Muthali ............. H04B 1/71635 |
| 2020/0272221 A1 | 8/2020 | Foster et al. |

FOREIGN PATENT DOCUMENTS

| CN | 107690753 | 2/2018 |
| CN | 109039783 | 12/2018 |
| CN | 110166967 | 8/2019 |
| CN | 111182506 | 5/2020 |
| CN | 111273969 | 6/2020 |
| WO | 2020147649 | 7/2020 |

OTHER PUBLICATIONS

CNIPA, Second Office Action for CN Application No. 202110761474. 8, Mar. 5, 2025.
WIPO, International Search Report and Written Opinion for International Application No. PCT/CN2022/073874, Apr. 15, 2022.
CNIPA, First Office Action for CN Application No. 202110761474. 8, Sep. 9, 2024.

\* cited by examiner

METHOD FOR OPERATION OF UWB TAG, UWB TAG, AND STORAGE MEDIUM

CROSS-REFERENCE TO RELATED APPLICATION(S)

This application is a continuation of International Application No. PCT/CN2022/073874, filed Jan. 25, 2022, which claims priority to Chinese Patent Application No. 202110296068.9, filed Mar. 19, 2021 and Chinese Patent Application No. 202110761474.8, filed Jul. 6, 2021, the entire disclosures of which are incorporated herein by reference.

TECHNICAL FIELD

The disclosure relates to the field of ultra wide band (UWB) technology, and in particular, to a method for operation of a UWB tag, a UWB tag, and a storage medium.

BACKGROUND

Ultra wide band (UWB) technology is a wireless carrier communication technology. The UWB technology does not use sinusoidal carriers, but uses nanoseconds non-sinusoidal narrow pulses to transmit data. Therefore, a frequency spectrum range occupied is wide, and a data transmission rate may reach hundreds of megabits per second (Mbits/s) or more.

In application scenarios, the UWB technology has advantages of low system complexity, low power spectral density of transmitted signals, being resistant to channel fading, low probability of interception, high positioning accuracy, etc., and is particularly suitable for high-speed wireless access in intensive multipath environments such as indoors.

SUMMARY

In an aspect, the method for operation of a UWB tag is provided in implementations of the disclosure. The UWB tag is provided with a UWB transceiver. The method includes the following. The UWB transceiver is controlled to be in a first transceiving state in response to the UWB tag being in a first state, where the first state belongs to a target-state set. The UWB tag is switched to a second state from the first state in response to a state transition event and the UWB transceiver is controlled to be in a second transceiving state, where the second state belongs to the target-state set.

In another aspect, the UWB tag is provided in implementations of the disclosure. The UWB tag includes a UWB transceiver and a controller. The UWB transceiver is electrically connected to the controller and is configured to transmit/receive a data frame on a channel. The controller is configured to: control the UWB transceiver to be in a first transceiving state in response to the UWB tag being in a first state, where the first state belongs to a target-state set; and switch the UWB tag to a second state from the first state in response to a state transition event and control the UWB transceiver to be in a second transceiving state, where the second state belongs to the target-state set.

In another aspect, a non-transitory computer-readable storage medium is provided in implementations of the disclosure. The computer-readable storage medium stores at least one program code, and the program code is loaded and executed by processor or a finite state machine (FSM) to implement the method for operation of the UWB tag in the above aspect.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to illustrate more clearly the technical solution in implementations of the disclosure, accompanying drawings required for illustrating implementations are introduced briefly as follows. Apparently, the accompanying drawings illustrated below are merely some implementations of the disclosure. For those skilled in the art, other drawings may also be obtained based on these accompanying drawings without creative efforts.

DETAILED DESCRIPTION

In order to make the objectives, technical solution, and advantages of the disclosure clearer, implementations of the disclosure are further described in detail below with reference to accompanying drawings.

As a slave, an ultra wide band (UWB) tag is generally configured to assist a terminal device to make the terminal device realize a specific function. For example, in order to enable the terminal device to have a spatial awareness capability, the UWB tag may be bundled with an internet of things (IoT) device, and thus the IoT device may be represented by the UWB tag. In an operation state, the UWB tag transmits a data frame on a channel, and the terminal device determines, by receiving the data frame, a relative location between the UWB tag and the terminal device, thereby determining a UWB tag facing the terminal device, and then controls the IoT device represented by the UWB tag.

As another example, in order to enable a user to locate an easily-lost item (such as a key, a wallet, or the like) by means of the terminal device, the user may put the UWB tag together with the easily-lost item in advance. When the user locates the easily-lost item, the terminal device exchanges data frame with the UWB tag, thereby determining a distance and an angle between the UWB tag and the terminal device based on the data frame exchanged, and then displays a location of the UWB tag based on the distance and the angle determined, so that the user can quickly locate the easily-lost item according to the location displayed.

Figure 1:
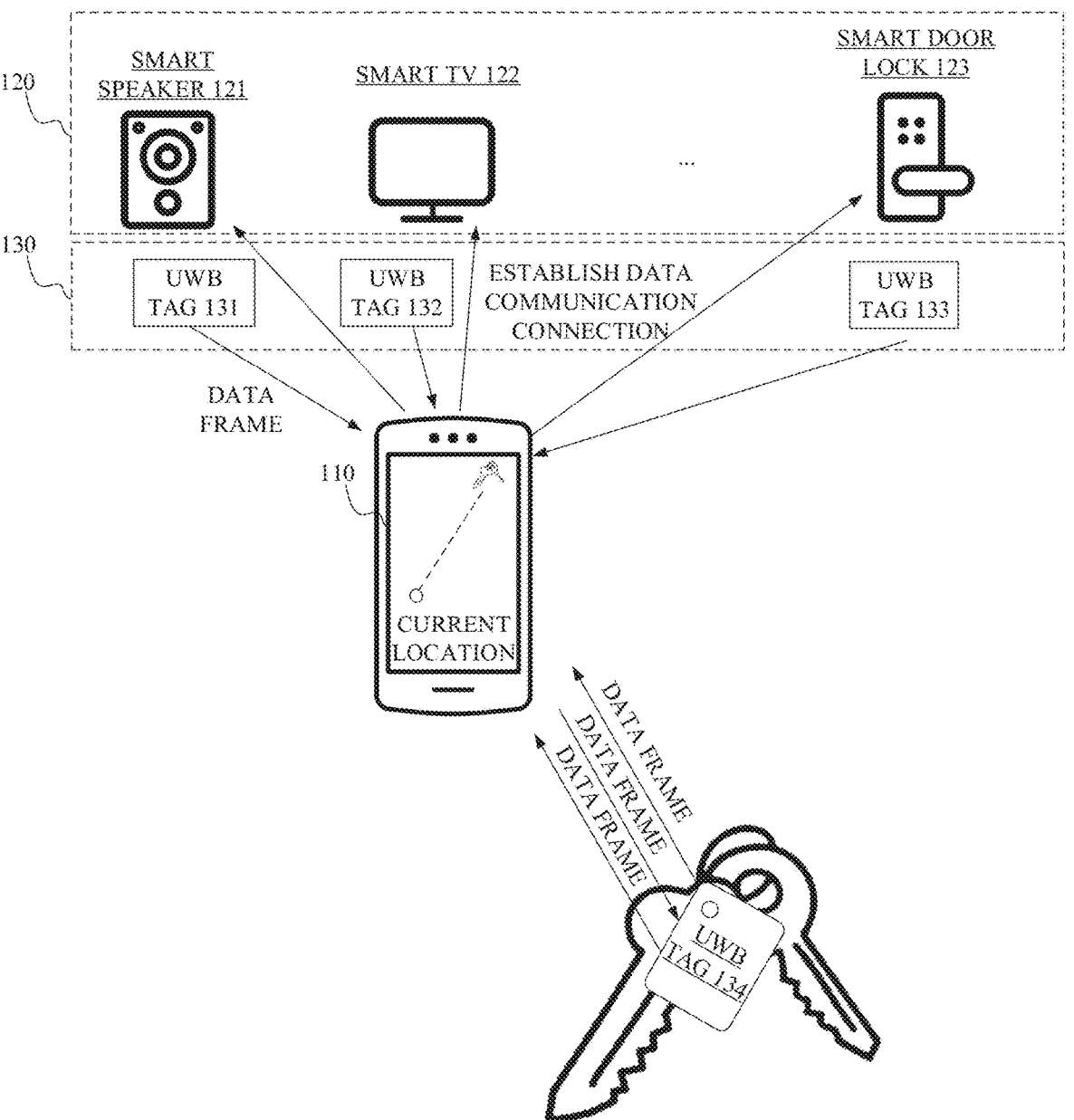
FIG. 1 is a schematic diagram of an implementation environment of an exemplary implementation of the disclosure.

Referring to FIG. 1, FIG. 1 is a schematic diagram of an implementation environment of an exemplary implementation of the disclosure. In the implementation environment, there are a terminal device 110, at least one IoT device 120, and at least one UWB tag 130.

The terminal device 110 is a device having the spatial awareness capability. The spatial awareness capability refers to that the terminal device 110 can be aware of spatial relations between the terminal device and other devices. The terminal device 110 may be a portable electronic device such as a smartphone, a tablet computer, a smart remote control, or a smart watch.

In implementations of the disclosure, the terminal device 110 realizes the spatial awareness capability with the aid of a UWB component and the UWB tag 130 representing the IoT device. The terminal device 110 can perform UWB communication with the UWB tag 130 through the UWB component, that is, the terminal device 110 can receive, though the UWB component, a data frame transmitted by the UWB tag 130 on a target channel, and determine a spatial relation between the terminal device 110 and the UWB tag 130 according to the data frame transmitted by the UWB tag 130.

Optionally, the UWB component may be separated from the terminal device 110, or the UWB component is independent of the terminal device 110, that is, the terminal device 110 can perform UWB communication with the UWB tag 130 when the terminal device 110 is equipped with the UWB component, and the terminal device 110 may be unable to perform UWB communication with the UWB tag 130 when the terminal device 110 is not equipped with the UWB component. In this application scenario, the UWB component may be packaged as a terminal accessory such as a phone cover, a phone protector, or a phone charm.

Optionally, the UWB component may also be disposed inside the terminal device 110, that is, the terminal device 110 is provided with the UWB component therein, and thus the terminal device 110 can perform UWB communication with the UWB tag 130 through the UWB component.

The IoT device 120 is an electronic device that can establish data communication connection with the terminal device 110, and may be a device such as a smart TV 122, a smart speaker 121, a smart door lock 123, a smart refrigerator, a smart air conditioner, a smart lighting, an in-car air conditioner, or other devices. The IoT device 120 and the terminal device 110 can exchange information through data communication connection, and the data communication connection may be Wi-Fi connection, Bluetooth connection, infrared connection, etc., which is not limited in implementations of the disclosure.

In implementations of the disclosure, the UWB tag 130 is configured to represent the IoT device 120, and is independent of the IoT device 120. "Independent" refers to that the UWB tag 130 is an apparatus independent of the IoT device 120 and may be sold independently as a product, rather than be integrated in the IoT device 120 as a part of the IoT device 120 or be a necessary component of the IoT device 120. Once the UWB tag 130 is bundled with the IoT device 120, the UWB tag 130 and the IoT device 120 do not have data communication connection, and instead, they only have a mapping relationship. The mapping relationship refers to that an IoT device 120 represented by a UWB tag 130 can be determined through the UWB tag 130. As illustrated in FIG. 1, a UWB tag 131 is configured to represent the IoT device 121, a UWB tag 132 is configured to represent the IoT device 122, and a UWB tag 133 is configured to represent the IoT device 123.

With regard to a power supply mode of the UWB tag 130, in a possible design, the UWB tag 130 is provided with an independent power supply, and the independent power supply may be a replaceable power supply, a non-replaceable power supply, or a rechargeable power supply. In another possible design, the UWB tag 130 is powered by the IoT device 120 (but they do not perform data communication), and a power supply mode of the IoT device 120 includes a wired power supply (for example, through a charging cable) or a wireless power supply (for example, through a wireless charging coil).

In implementations of the disclosure, in the operation state, the UWB tag 130 transmits a data frame to the terminal device 110 on the target channel. After the terminal device 110 receives the data frame on the target channel, the terminal device 110 determines the IoT device 120 represented by the UWB tag 130, establishes data communication connection with the IoT device 120, and then controls the IoT device 120 through data communication connection.

In another possible application scenario, a UWB tag 134 and an item (for example, a non-smart object such as a key, a wallet, or an umbrella) are placed together (placed together with the key in FIG. 1), so as to realize object positioning. In the operation state, the UWB tag 134 transmits a data frame on a target channel, and the terminal device 110 transmits a data frame on the target channel to the UWB tag 134 when the terminal device 110 starts object positioning. When the UWB tag 134 receives the data frame on the target channel, the UWB tag 134 transmits a data frame to the terminal device 110 again, to make the terminal device 110 determine, based on the data frames twice-received, a distance and an angle between the UWB tag 134 and the terminal device 110, and to make the terminal device 110 display the distance and the angle, thereby facilitating quick item positioning for a user.

It should be noted that the UWB tag may be configured to only realize object positioning, only realize spatial awareness of a device, or realize both object positioning and spatial awareness of a device (the UWB tag may be switched between the two functions), which is not limited in the implementations.

In implementations of the disclosure, a method for operation of a UWB tag is provided. The UWB tag is provided with a UWB transceiver. The method includes the following. the UWB transceiver is controlled to be in a first transceiving state in response to the UWB tag being in a first state, where the first state belongs to a target-state set; and the UWB tag is switched to a second state from the first state in response to a state transition event and the UWB transceiver is controlled to be in a second transceiving state, where the second state belongs to the target-state set.

Optionally, the UWB tag is switched to the second state from the first state in response to the state transition event as following. The second state corresponding to the state transition event is determined based on the first state and a state transition relationship in response to the state transition event, where the state transition relationship is used to represent a transition relationship between states in the target-state set. The UWB tag is switched to the second state from the first state.

Optionally, the target-state set includes a sleep state, a transmitting state, a waiting state, and a listening state, and the UWB transceiver is controlled to be in the first transceiving state in response to the UWB tag being in the first state by: controlling the UWB transceiver to be in an off state in response to the UWB tag being in the sleep state or the waiting state; or controlling the UWB transceiver to be in a transmission-enabled state in response to the UWB tag being in the transmitting state; or controlling the UWB transceiver to be in a reception-enabled state in response to the UWB tag being in the listening state.

Optionally, the second state corresponding to the state transition event is determined based on the first state and the state transition relationship in response to the state transition event as follows. The listening state is determined determining, based on the state transition relationship, as the second state in response to the first state being the sleep state and a sleep duration being reached; or the sleep state is determined, based on the state transition relationship, as the second state in response to the first state being the transmitting state and the UWB transceiver completing data frame transmission; or the listening state is determined, based on the state transition relationship, as the second state in response to the first state being the waiting state and a waiting duration being reached; or the transmitting state is determined, based on the state transition relationship, as the second state in response to the first state being the listening state and a target channel being idle within a listening duration; or the waiting state is determined, based on the state transition relationship, as the second state in response to the first state being the listening state and the target channel being occupied within the listening duration.

Optionally, the UWB transceiver is controlled by a finite state machine (FSM), the target-state set is a finite state set corresponding to the FSM, and the FSM is consisted of a register and a combinational logic circuit. The register includes: a first register configured to store the sleep duration; a second register configured to store the listening duration; a third register configured to store a waiting unit duration, where the waiting duration is determined through a random number generated by the combinational logic circuit and the waiting unit duration; and a fourth register configured to store a transceiver parameter, where the transceiver parameter includes at least one of the target channel, a rate, or a data frame format.

Optionally, the target-state set includes a first transmitting state, a receiving state, a second transmitting state, a first sleep state, and a second sleep state, and the UWB transceiver is controlled to be in the first transceiving state in response to the UWB tag being in the first state by: controlling the UWB transceiver to be in a transmission-enabled state in response to the UWB tag being in the first transmitting state or the second transmitting state; or controlling the UWB transceiver to be in a reception-enabled state in response to the UWB tag being in the receiving state; or controlling the UWB transceiver to be in an off state in response to the UWB tag being in the first sleep state or the second sleep state.

Optionally, the second state corresponding to the state transition event is determined based on the first state and the state transition relationship in response to the state transition event by: determining, based on the state transition relationship, the receiving state as the second state in response to the first state being the first transmitting state and the UWB transceiver completing data frame transmission; or determining, based on the state transition relationship, the second transmitting state as the second state in response to the first state being the receiving state and the UWB transceiver receiving a data frame transmitted by a terminal device; or determining, based on the state transition relationship, the first sleep state as the second state in response to the first state being the receiving state and the UWB transceiver receiving no data frame transmitted by the terminal device within a timeout duration; or determining, based on the state transition relationship, the second sleep state as the second state in response to the first state being the second transmitting state and the UWB transceiver completing data frame transmission; or determining, based on the state transition relationship, the first transmitting state as the second state in response to the first state being the first sleep state and a first sleep duration being reached; or determining, based on the state transition relationship, the first transmitting state as the second state in response to the first state being the second sleep state and a second sleep duration being reached, where the first sleep duration is greater than the second sleep duration.

Optionally, the UWB transceiver is controlled by an FSM, the target-state set is a finite state set corresponding to the FSM, and the FSM is consisted of a register and a combinational logic circuit. The register includes: a fifth register configured to store the first sleep duration; a sixth register configured to store the second sleep duration; a seventh register configured to store a first idle duration that is a duration required for the terminal device to switch a receiver to a transmitter under the first transmitting state; an eighth register configured to store a second idle duration that is a duration required for the terminal device to switch the transmitter to the receiver under the receiving state; a ninth register configured to store the timeout duration; and a tenth register configured to store a transceiver parameter, where the transceiver parameter includes at least one of a target channel, a rate, or a data frame format.

Optionally, the UWB transceiver is controlled by a micro controller unit (MCU) or an FSM.

Optionally, the UWB tag has at least two operation modes, different operation modes correspond to different target-state sets, and the method further includes: performing operation-mode switching in response to an operation-mode switching instruction, where the operation-mode switching instruction is triggered though a physical key on the UWB tag.

Optionally, the UWB transceiver is controlled by an FSM, the target-state set is a finite state set corresponding to the FSM, the UWB tag is provided with at least two FSMs, different FSMs correspond to different operation modes of the UWB tag, different FSMs correspond to different finite state sets. Operation-mode switching is performed by in response to the operation-mode switching instruction includes by performing FSM switching in response to the operation-mode switching instruction.

Optionally, the UWB tag has a first operation mode and a second operation mode. Under the first operation mode, the UWB tag periodically transmits a data frame, to make a terminal device determine, according to the data frame, an IoT device represented by the UWB tag, and control the IoT device. Under the second operation mode, the UWB tag exchanges a data frame with the terminal device, to make the terminal device determine a distance and an angle between the terminal device and the UWB tag according to the data frame exchanged.

Figure 2:
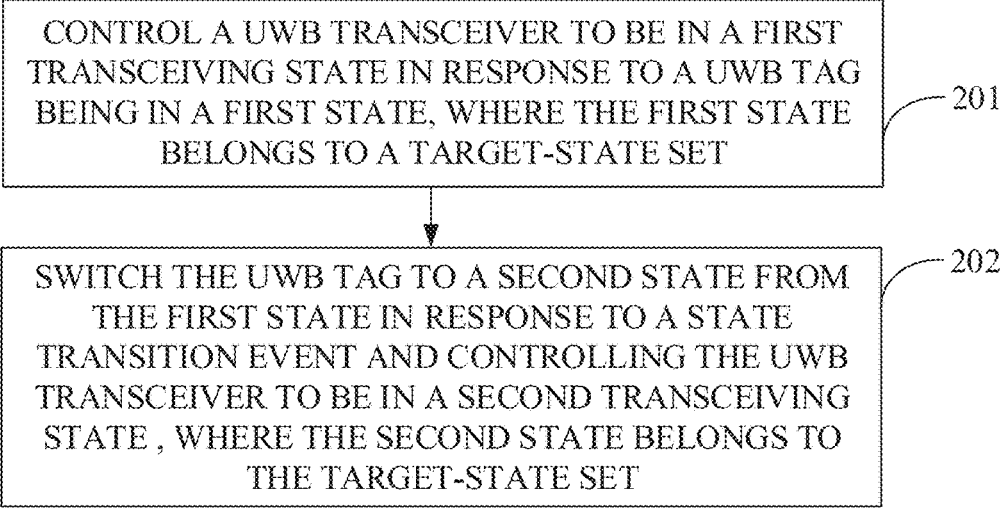
FIG. 2 is a flowchart of a method for operation of an ultra wide band (UWB) tag provided in an exemplary implementation of the disclosure.

Referring to FIG. 2, and FIG. 2 is a flowchart of a method for operation of a UWB tag provided in an exemplary implementation of the disclosure. For example, in implementations of the disclosure, the method is applied to the UWB tag illustrated in FIG. 1. The method includes the following.

S201, a UWB transceiver is controlled to be in a first transceiving state in response to the UWB tag being in a first state, where the first state belongs to a target-state set.

In implementations of the disclosure, the UWB tag is provided with the UWB transceiver and a controller, and the controller is electrically connected to the UWB transceiver and configured to control a transceiving state of the UWB transceiver. The UWB transceiver includes a receiver (RX) and a transmitter (TX). The transceiving state of the UWB transceiver include: a reception-enabled state (the RX is ON and the TX is OFF), a transmission-enabled state (the TX is ON and the RX is ON), and an off state (both the RX and the TX are OFF).

In a possible implementation, the controller corresponds to the target-state set, the target-state set is consisted of states of the UWB tag during operation, and state transition is supported between states in the target-state set. Correspondingly, during operation, a current state of the UWB tag is transferred between states in the target-state set. Since the UWB tag is required to implement different transceiving functions when the UWB tag is in different states, the UWB tag is configured to control the transceiving state of the UWB transceiver by means of the controller. The first transceiving state of the UWB transceiver is determined based on a first state of the UWB tag.

In a possible design, the controller is an MCU. The MCU is configured to control the UWB transceiver of the UWB tag to transmit or receive data frames.

However, since the UWB tag is generally powered by a built-in battery, and the built-in battery is non-replaceable, how to reduce a power consumption of the UWB tag in the operation state to prolong the service life of the UWB tag has become an urgent issue. The operation state of the UWB tag is periodic when the UWB tag operates as the slave, and therefore, in another possible design, the control device of the UWB tag is an FSM, that is, the UWB transceiver is controlled by the FSM (the target-state set is a finite state set of the FSM). In the operation state, the FSM can control the transceiving state of the UWB transceiver based on a current state of the UWB tag, switch the current state of the UWB tag in response to the state transition event triggered, adjust the transceiving state of the UWB transceiver, and realize the function of the UWB tag.

In some implementations, the FSM is consisted of a register and a combinational logic circuit. The register is configured to store a parameter required for realizing state transition, and the combinational logic circuit is configured to realize state transition and control the transceiving state of the UWB transceiver.

Optionally, when the UWB tag is configured to only realize a single function, the UWB tag is provided with only one FSM. When the UWB tag is configured to realize at least two functions, the UWB tag is provided with at least two FSMs, the at least two FSMs are all electrically connected to the UWB transceiver, and only one FSM operates at the same moment.

S202, the UWB tag is switched to a second state from the first state in response to a state transition event and the UWB transceiver is controlled to be in a second transceiving state, where the second state belongs to the target-state set.

In a possible implementation, in the first state, if the controller receives a state transition instruction corresponding to the state transition event, the controller controls the UWB tag to perform state transition, and the UWB tag is switched from the first state to the second state (the second state also belongs to the target-state set). The second state may be different from or the same as the first state. Furthermore, the state transition instruction may be transmitted by the UWB transceiver, for example, the state transition instruction may be a completion instruction transmitted by the UWB transceiver when the UWB transceiver completes data frame transmission, or a listening result instruction (indicating whether a channel is idle) transmitted by the UWB transceiver when the UWB transceiver completes channel listening. Alternatively, the state transition instruction may be transmitted by a timer, for example, the state transition instruction may be a time up instruction transmitted by the timer when a timing duration of the timer is reached.

Because the transceiving function that the UWB tag is required to implement in the second state may be the same as the transceiving function that the UWB tag is required to implement in the first state, when switching to the second state, the UWB tag needs to adjust, by means of the controller, the transceiving state of the UWB transceiver, so as to make the UWB transceiver be in the second transceiving state corresponding to the second state.

During subsequent process, when the state transition event exists, the operation state of the UWB tag further changes, and the controller further adjusts the transceiving state of the UWB transceiver, which is not repeated herein in the implementations.

In the same state, for different state transition events, the UWB tag has different states after switching, and therefore, in a possible implementation, a state switching process of the UWB tag may include the following.

I. the second state corresponding to the state transition event is determined based on the first state and a state transition relationship in response to the state transition event, where the state transition relationship is used to represent a transition relationship between states in the target-state set.

A transition relationship between states in the target-state set is referred to as the state transition relationship. The state transition relationship may be illustrated by means of a table (state transition table) or a diagram (state transition diagram), and state transition is implemented by the controller. For example, when the controller is the FSM, state transition may be implemented through the combinational logic circuit in the FSM.

In a possible implementation, the state transition relationship includes a state and a state transition event. The state transition event is used to trigger state transition between different states (for example, the state transition event triggers state transition from state A to state B), or is used to trigger transition of its own state (that is, the state transition event triggers maintenance of state A).

The same state may be switched to different states in response to different state transition events, and therefore, in the state transition relationship, the controller takes the first state as a start and the state transition event as a path, and determines a state corresponding to an end as the second state.

In an illustrative example, the state transition relationship is illustrated in Table 1.

TABLE 1

| Start State | State Transition Event | End State |
|---|---|---|
| state 1 | event A | state 2 |
| state 1 | event B | state 3 |

When the first state is the state 1 and the state transition event is the event A, the controller determines the state 2 as the second state based on the state transition relationship. When the state transition event is the event B, the controller determines the state 3 as the second state based on the state transition relationship.

II. the UWB tag is switched to the second state from the first state.

Furthermore, the controller switches the UWB tag from the first state to the second state, and correspondingly adjusts the transceiving state of the UWB transceiver.

In conclusion, in implementations of the disclosure, the UWB tag is provided with the controller, and the controller controls the transceiving state of the UWB transceiver based on a current state of the UWB tag, switches the current state of the UWB tag when the state transition event is triggered, and adjusts the transceiving state of the UWB transceiver. The operation state of the UWB tag is periodic, and therefore, the controller controls transmission/reception of the UWB transceiver based on the state and the state transition event. As such, normal operation of the UWB tag can be ensured, and additionally, the control flow can be simplified, such that the cost and the power consumption of the UWB tag can be reduced, and the service life of the UWB tag can be improved.

In addition, according to the solution provided in implementations of the disclosure, using "UWB transceiver+ FSM" can realize the normal operation of the UWB tag, and the MCU is not required to be disposed in the UWB tag. As such, on the one hand, the manufacturing costs of the UWB tag can be reduced, and on the other hand, since a power consumption of an FSM is far lower than a power consumption of the MCU, the power consumption of the UWB tag can be further reduced, and the service life of the UWB tag can be prolonged.

In the operation state, UWB tags with different functions perform different transceiving operations. For example, the UWB tag configured to realize space awareness in FIG. 1 needs to only transmit a data frame in the operation state, and does not need to receive a data frame (only transmitting and not receiving). The UWB tag configured to realize object positioning in FIG. 1 needs to transmit a data frame in the operation state, and further needs to receive a data frame transmitted by the terminal device. Therefore, controllers in UWB tags with different functions correspond to different target-state sets and different state transition relationships. Operation processes of the UWB tags with different functions are described below by using exemplary implementations.

Figure 3:
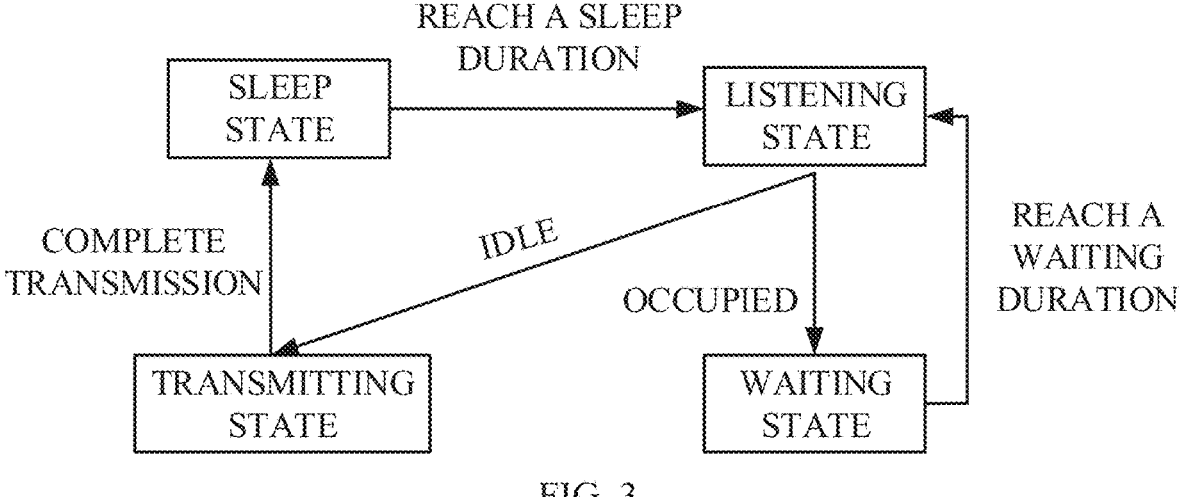
FIG. 3 is a schematic diagram illustrating state transition of a UWB tag when the UWB tag implements a spatial awareness function.

In a possible implementation, when the UWB tag is configured to realize a spatial awareness function, the target-state set corresponding to the controller includes a sleep state, a transmitting state, a waiting state, and a listening state. Correspondingly, the state transition relationship is illustrated in FIG. 3.

When the UWB tag implements the spatial awareness function, the UWB tag needs to periodically transmit data frames (transmitting state) on the target channel, and sleeps for a period (sleep state) after completing data frame transmission. Furthermore, the UWB tag only performs transmission and does not perform reception, and there may be other UWB tags implementing space awareness in the same space. Therefore, in order to avoid mutual influence on multiple UWB tags caused by simultaneous data frame transmission of the multiple UWB tags on the target channel, the UWB tag firstly needs to listen to the target channel (listening state) before transmitting a data frame, so as to determine a channel state of the target channel. When the target channel is idle, the UWB tag transmits a data frame, and when the target channel is occupied, the UWB tag needs to wait for a period (waiting state), and listens to the target channel again after the waiting ends.

Based on the current state of the UWB tag, the controller controlling the transceiving state of the UWB transceiver includes the following several possible scenarios.

1. the UWB transceiver is controlled to be in an off state in response to the UWB tag being in the sleep state or the waiting state.

In order to reduce the power consumption of the UWB tag, the UWB tag enters the sleep state after completing data frame transmission. In the sleep state, the controller controls the UWB transceiver to be in the off state. That is, the UWB tag neither transmits a data frame on the target channel nor receives a data frame on the target channel.

Figure 4:
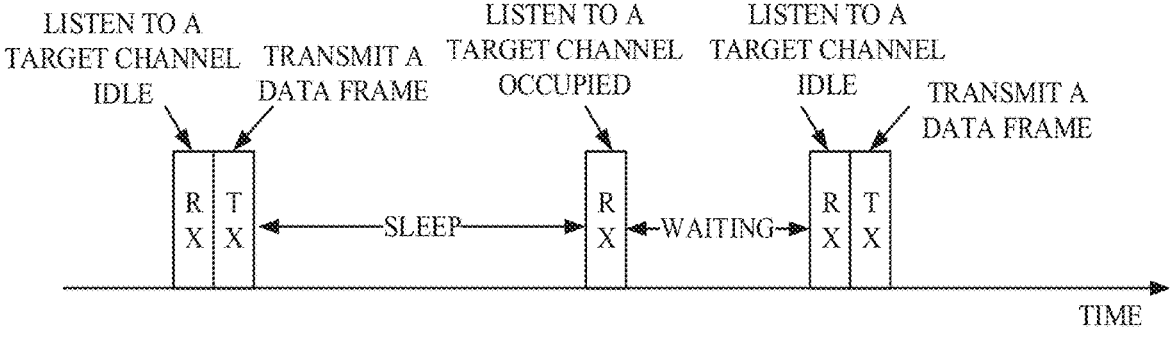
FIG. 4 is a schematic diagram illustrating an operation state change of a UWB tag when the UWB tag implements a spatial awareness function.

Exemplarily, as illustrated in FIG. 4, after the UWB tag completes data frame transmission, the UWB tag enters the sleep state, and both the RX and the TX of the UWB transceiver are in the off state.

Furthermore, in the waiting state, in order to avoid interference to data frames transmitted by other UWB tags on the target channel, and reduce the power consumption of the UWB tag, the controller also controls the UWB transceiver to be in the off state after the UWB tag enters the waiting state.

Exemplarily, as illustrated in FIG. 4, after the UWB tag enters the waiting state, both the RX and the TX of the UWB transceiver are in the off state.

2. the UWB transceiver is controlled to be in a transmission-enabled state in response to the UWB tag being in the transmitting state.

In the transmitting state, in order to make the terminal device receive the data frame transmitted by the UWB tag on the target channel, and to determine a spatial relation between the terminal device and the UWB tag based on the data frame, the controller needs to control the TX of the UWB transceiver to be in an on state when the UWB tag is in the transmitting state, so as to transmit the data frame by means of the TX on the target channel in a broadcast manner. Optionally, the RX of the UWB transceiver is in the off state when the UWB transceiver is in transmission-enabled state.

For example, as illustrated in FIG. 4, in the transmitting state, the TX of the UWB transceiver is turned on, and the RX of the UWB transceiver is turned off.

3. the UWB transceiver is controlled to be in a reception-enabled state in response to the UWB tag being in the listening state.

In the listening state, in order to determine whether another UWB tag transmitting a data frame on the target channel exists or not, the controller needs to control the RX of the UWB transceiver to be in the on state, and thus the UWB tag can realize target channel listening by means of the RX. It should be noted that, channel listening is only used for monitoring and evaluation for a channel state, and receiving and analyzing data frames transmitted by other UWB tags on the target channel are not required, that is, the UWB tag can maintain extremely low power consumption during channel listening.

Optionally, when the UWB transceiver is in the reception-enabled state, the TX of the UWB transceiver is in the off state.

Exemplarily, as illustrated in FIG. 4, in the listening state, the RX of the UWB transceiver is turned on, and the TX of the UWB transceiver is turned off.

In some implementations, the UWB tag listens to the target channel by means of the RX within a backoff time period (e.g., 320 us), or listens to the target channel at a time point.

In a possible implementation, a listening manner used when the UWB tag listens to the target channel includes at least one of energy detection or carrier detection. Optionally, if energy detection is used for listening to the target channel, the target channel is determined to be occupied when an energy of the target channel is greater than an energy threshold value, and that the target channel is determined to be idle when the energy of the target channel is less than the energy threshold value.

If carrier detection is used for listening to the target channel, that the target channel is determined to be occupied when there is a carrier signal of a preset frequency on the target channel, and that the target channel is determined to be idle when there is no carrier signal of the preset frequency on the target channel.

In implementations of the disclosure, a data frame contains information that can indicate an IoT device represented by a UWB tag. Correspondingly, the terminal device receives, on the target channel, the data frame transmitted by the UWB tag, and further determines, according to the information contained in the data frame, the IoT device represented by the UWB tag, and then control the IoT device.

Correspondingly, determining, by the controller, the second state based on different first states and different state transition events includes the following several possible cases.

1. the listening state is determined, based on the state transition relationship, as the second state in response to the first state being the sleep state and a sleep duration being reached.

In the operation state, the UWB tag periodically performs data frame transmission and enters the sleep state. When a duration that the UWB tag is in the sleep state reaches the sleep duration, the UWB tag needs to be woken up and to perform data frame transmission again, and the UWB tag needs to perform channel listening before transmitting the data frame. Therefore, in the state transition relationship, the state transition event that triggers state transition from the sleep state to the listening state is that the sleep duration is reached.

Exemplarily, as illustrated in FIG. 3, in the sleep state, when the controller receives a time up instruction transmitted by a timer (a timing duration of the timer is the sleep duration), the controller determines the listening state as the second state, and switches the UWB tag to the listening state, so as to control the RX of the UWB transceiver to be turned on, thereby realizing target channel listening.

The sleep duration is a preset fixed duration.

2. the sleep state is determined, based on the state transition relationship, as the second state in response to the first state being the transmitting state and the UWB transceiver completing data frame transmission.

In order to reduce the power consumption of the UWB tag, the UWB tag in the operation state is in the sleep state most of the time. In the state transition relationship, the state transition event that triggers state transition from the transmitting state to the sleep state is that data frame transmission is completed.

Exemplarily, as illustrated in FIG. 3, in the transmitting state, when the controller receives a transmission completion instruction transmitted by the UWB transceiver, the controller determines the sleep state as the second state, and switches the UWB tag to the sleep state, so as to control the UWB transceiver to be turned off, such that the power consumption of the UWB tag can be reduced.

3. the listening state is determined, based on the state transition relationship, as the second state in response to the first state being the waiting state and a waiting duration being reached.

In a possible implementation, when the UWB tag listens to that the target channel is occupied, the UWB tag enters the waiting state. The waiting duration of the waiting state is a random delay duration. In order to make the UWB tag normally transmit a data frame and be detected by the terminal device, the UWB tag needs to finish the waiting state to perform data frame transmission again, and needs to perform channel listening before transmitting the data frame. Therefore, in the state transition relationship, the state transition event that triggers state transition from the waiting state to the listening state is that the waiting duration is reached.

Optionally, the UWB tag performs a random delay according to the ALOHA protocol.

Exemplarily, as illustrated in FIG. 3, in the waiting state, when the controller receives a time up instruction transmitted by a timer (a timing duration of the timer is the waiting duration), the controller determines the listening state as the second state, and switches the UWB tag to the listening state, so as to control the RX of the UWB transceiver to be turned on, thereby realizing target channel listening.

4. the transmitting state is determined, based on the state transition relationship, as the second state in response to the first state being the listening state and a target channel being idle within a listening duration.

In the listening state, based on different channel-listening results, the UWB tag may be switched to different states, that is, in the listening state, second states determined based on different state transition events are different. When the target channel is idle within the listening duration, it is indicated that the target channel of the UWB tag is not occupied by other UWB tags, and the UWB tag can perform data frame transmission. Therefore, in the state transition relationship, the state transition event that triggers state transition from the listening state to the transmitting state is that the target channel is idle within the listening period.

In a possible implementation, the UWB transceiver feeds back a channel-listening result to the controller, and the controller determines the second state based on the channel-listening result and the state transition relationship.

Exemplarily, as illustrated in FIG. 3, in the listening state, when the UWB transceiver listens to that the target channel is idle within the listening duration, the UWB transceiver transmits, to the controller, a listening result instruction indicating that the channel is idle. Correspondingly, the controller determines the transmitting state as the second state based on the listening result instruction, and controls the UWB tag to switch to the transmitting state, so as to control the TX of the UWB transceiver to be turned on, thereby realizing data frame transmission.

5. the waiting state is determined determining, based on the state transition relationship, as the second state in response to the first state being the listening state and the target channel being occupied within the listening duration.

When the target channel is occupied within the listening duration, it is indicated that other UWB tags are performing data frame transmission on the target channel. The UWB tag cannot perform data frame transmission, needs to wait for a period, and then performs channel listening again. Therefore, in the state transition relationship, the state transition event that triggers state transition from the listening state to the waiting state is that the target channel is occupied within the listening duration.

Exemplarily, as illustrated in FIG. 3, in the listening state, when the UWB transceiver listens to that the target channel is occupied within the listening duration, the UWB transceiver transmits, to the controller, the listening result instruction indicating that the channel is occupied. Correspondingly, the controller determines the waiting state as the second state based on the listening result instruction, and switches the UWB tag to the waiting state, so as to control the UWB transceiver to be turned off, such that the power consumption of the UWB tag can be reduced.

Figure 5:
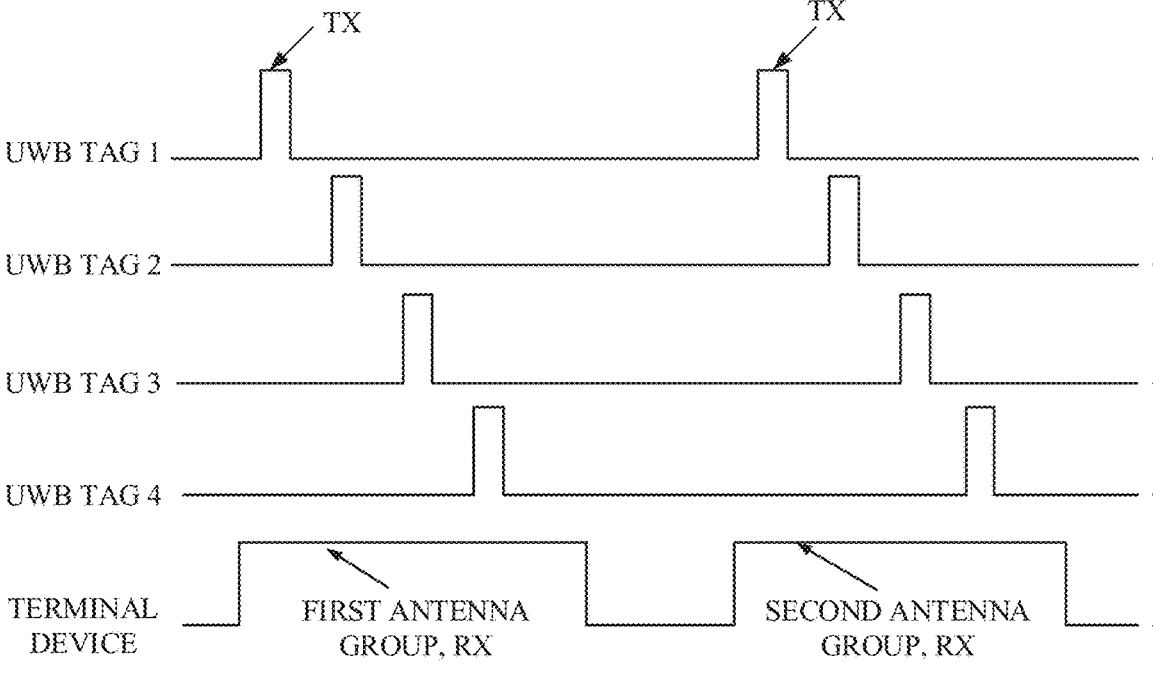
FIG. 5 is a schematic diagram illustrating a process that a terminal device receives a data frame when a spatial awareness function is implemented.

Exemplarily, as illustrated in FIG. 5, when four UWB tags are arranged in the environment, each UWB tag enters the sleep state immediately after completing data frame transmission. After the sleep duration is reached, each UWB tag is woken up again, and performs data frame transmission in a next cycle (in the figure, only the data frame transmission process is illustrated, while the channel listening process is not illustrated).

It should be noted that, in an initial operation stage of the UWB tag, the UWB tag frequently listens to that the target channel is occupied. However, under the effect of channel listening and a random delay mechanism, if the UWB tags in the environment are not changed, as the operation time increases, a data frame transmission frequency of each UWB tag tends to be stable, that is, the UWB tag listens to less and less that the target channel is occupied until the UWB tag listens to no occupancy of the target channel, and all the UWB tags orderly perform data frame transmission on the target channel, which are not in conflict with each other. As illustrated in FIG. 5, after operation for a period, the four UWB tags periodically perform data frame transmission in order.

In order to make the terminal device determine a spatial relation between the UWB tag and the terminal device, the terminal device alternately receives data frames, transmitted by various UWB tags, on the target channel via a first antenna group and a second antenna group, that is, the terminal device receives the data frames transmitted by the same UWB tag via different antenna groups.

In a possible implementation, the terminal device first receives a data frame on the target channel via the first antenna group. When a data frame receiving period of the first antenna group reaches a preset period, the terminal device switches to receive a data frame on the target channel via the second antenna group.

Exemplarily, as illustrated in FIG. 5, the terminal device first receives, via the first antenna group, data frames transmitted by the UWB tags 1-4 on the target channel, and then switches to receive, via the second antenna group, data frames transmitted by the UWB tags 1-4 on the target channel.

Optionally, angle of arrival (AOA) measurement or phase difference of arrival (PDoA) measurement may be used when spatial positioning is performed based on a data frame. Based on the AOA measurement, a spatial relation of an object can be determined according to an AOA of the data frame. Based on the PDoA measurement, a spatial relation of an object can be determined according to a PDoA of a data frame. A specific manner for determining the spatial relation is not limited in implementations of the disclosure.

Furthermore, based on the spatial relation, the terminal device determines a directed UWB tag as a target UWB tag (for example, an angle in the horizontal direction between the UWB tag and the terminal device is in a horizontal angular range, and an angle in the vertical direction between the UWB tag and the terminal device is in a vertical angular range), and determines an IoT device represented by the target UWB tag as a target IoT device, so as to control the target IoT device.

Optionally, in order to avoid an invalid data communication connection between the terminal device and the target IoT device due to a misoperation of a user, thereby avoiding an occupation for device resources of the target IoT device, in a possible implementation, a connection condition is provided. That is, when the connection condition is satisfied, the terminal device is allowed to establish data communication connection with the target IoT device and control the target IoT device. The connection requirement includes at least one of a directing duration condition, a gesture condition, a touch-sensitive condition, a sensor condition, or a voice control condition.

In a possible design, when the FSM is used as the controller, in order to realize the spatial awareness function described, a register of the FSM needs to store a necessary parameter. In a possible implementation, a memory of the FSM includes a first register, a second register, a third register, and a fourth register.

1. The first register is configured to store the sleep duration.

The FSM is configured to read the sleep duration stored in the first register. When a duration that the UWB tag is in the sleep state reaches the sleep duration, the FSM switches the UWB tag to the listening state. The sleep duration may be 500 ms or 1 s, which is not limited in the implementations.

2. The second register is configured to store the listening duration.

The FSM is configured to control, through reading the listening duration stored in the second register, the UWB transceiver to be in the listening state within the listening duration, to listen to the target channel.

3. The third register is configured to store a waiting unit duration, where the waiting duration is determined through a random number generated by the combinational logic circuit and the waiting unit duration.

In a possible implementation, in the waiting state, the combinational logic circuit generates a random number, and determines a product of the random number and the waiting unit duration in the third register as the waiting duration of this waiting state. The waiting unit duration may be a backoff duration (320 us), and the random number generated by the combinational logic circuit is within a preset random-number range, such as 1-8.

4. The fourth register is configured to store a transceiver parameter, where the transceiver parameter includes at least one of the target channel, a rate, or a data frame format.

The transceiver parameter includes a TX parameter and an RX parameter, and is used for indicating the target channel to be listened to and for data frame transmission, the rate for transmitting a data frame on the target channel, and the frame format of the data frame transmitted.

In the implementations, the controller controls the transceiving state of the UWB transceiver, to make the UWB tag periodically enter the transmitting state and the sleep state, such that the power consumption of the UWB tag can be reduced. Additionally, the terminal device can determine the spatial relation between the UWB tag and the terminal device based on the data frame transmitted by the UWB tag, and thus the terminal device can control the IoT device represented by the target UWB tag, thereby improving the control efficiency for the IoT device.

Figure 6:
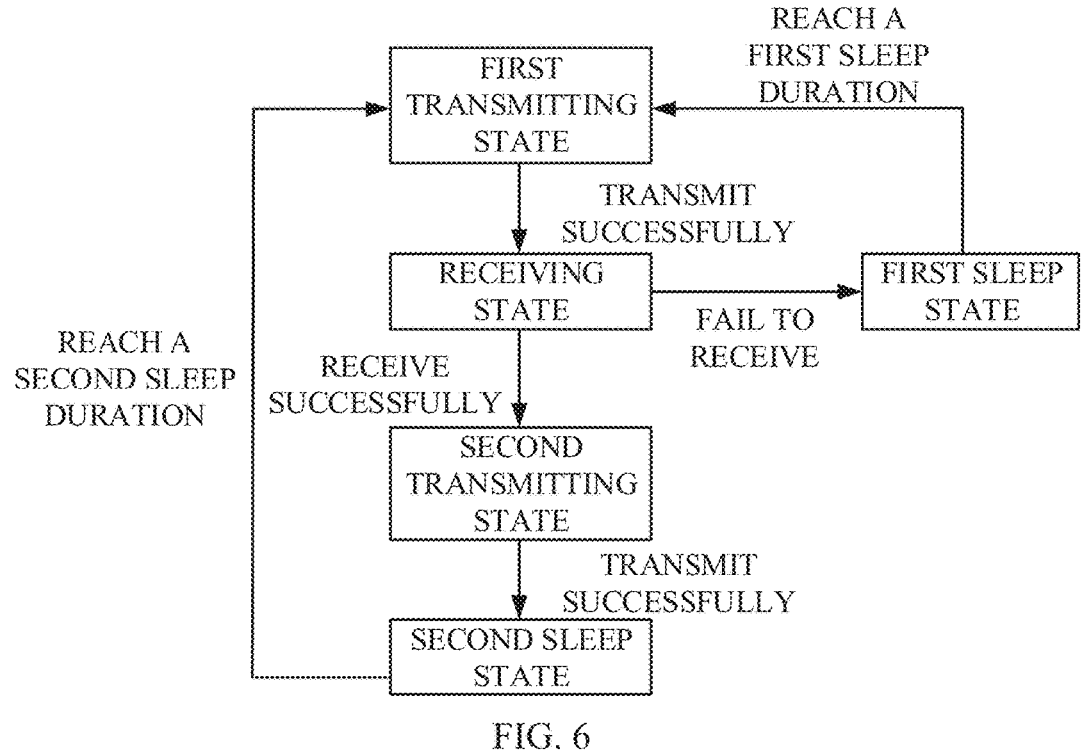
FIG. 6 is a schematic diagram illustrating state transition of a UWB tag when the UWB tag implements an object positioning function.

In another possible implementation, when the UWB tag is used to realize the object positioning function, the target-state set corresponding to the controller includes a first transmitting state, a receiving state, a second transmitting state, a first sleep state, and a second sleep state. Correspondingly, the state transition relationship is illustrated in FIG. 6.

When the UWB tag implements the object positioning function, the UWB tag will receive a data frame fed back by the terminal device (reception) after the UWB tag transmits a data frame on the target channel (first transmitting state). If the UWB tag receives the data frame fed back by the terminal device (the terminal device feeds back the data frame when the terminal device has a positioning requirement), the UWB tag transmits a data frame again on the target channel (second transmitting state), and sleeps for a period after completing transmission (second sleep state). Correspondingly, the terminal device locates the UWB tag based on the data frames twice-received. If the UWB tag receives no data frame fed back by the terminal device (the terminal device does not feed back any data frame when the terminal device does not have the positioning requirement), the UWB tag sleeps for a period (first sleep state), and transmits a data frame again after sleep.

Based on the current state of the UWB tag, the controller controlling the transceiving state of the UWB transceiver includes the following several possible cases.

1. the UWB transceiver is controlled to be in a transmission-enabled state in response to the UWB tag being in the first transmitting state or the second transmitting state.

The first transmitting state refers to a state in which the UWB tag transmits a data frame after the UWB tag is woken up or initialized. The second transmitting state refers to a state in which the UWB tag receives a data frame transmitted by the terminal device and transmits a data frame again.

In the transmitting state, in order to make the terminal device receive, on the target channel, a data frame transmitted by the UWB tag, and then determine a distance and an orientation relation between the terminal device and the UWB tag based on the data frame, when the UWB tag is in the transmitting state, the controller needs to control a TX of the UWB transceiver to be in an on state, so as to make the TX transmit a data frame on the target channel in a broadcast manner. Optionally, when the UWB transceiver is in the transmission-enabled state, an RX of the UWB transceiver is in an off state.

Figure 7:
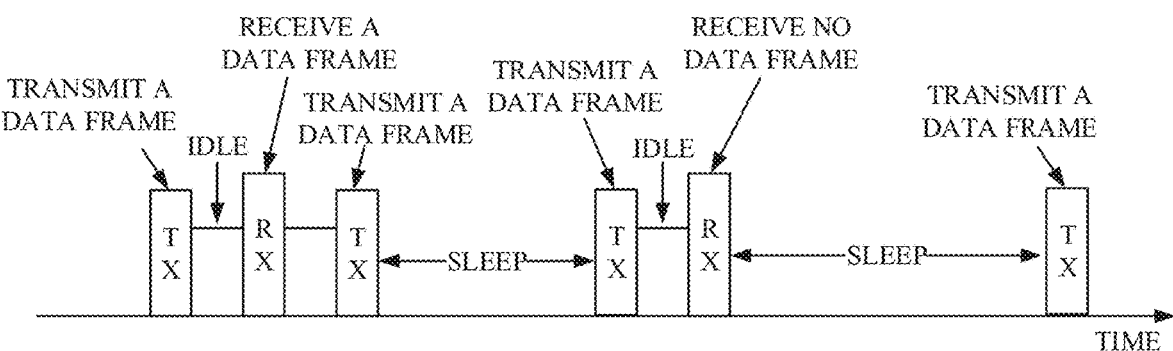
FIG. 7 is a schematic diagram illustrating an operation state change of a UWB tag when the UWB tag implements an object positioning function.

Exemplarily, as illustrated in FIG. 7, in the first/second transmitting state, the TX of the UWB transceiver is turned on, and the RX of the UWB transceiver is turned off.

2. the UWB transceiver is controlled to be in a reception-enabled state in response to the UWB tag being in the receiving state.

In a possible implementation, the terminal device determines the distance between the terminal device and the UWB tag through double-side two-way ranging (DS-TWR). During ranging, the UWB tag firstly transmits a data frame to the terminal device, and after the terminal device receives the data frame, the terminal device feeds back a data frame to the UWB tag. After the UWB tag receives the data frame fed back, the UWB tag transmits a data frame to the terminal device again.

When the terminal device has a requirement to locate a UWB tag, the terminal device will respond to a data frame transmitted by the UWB tag, and when the terminal device does not have the requirement to locate a UWB tag, the terminal device will not respond to a data frame transmitted by the UWB tag.

Therefore, when the UWB tag is in the receiving state, the controller controls the RX of the UWB transceiver to be in the on state, and determines, based on whether the RX receives the data frame fed back by the terminal device, whether the UWB tag further needs to transmit a data frame to the terminal device.

Exemplarily, as illustrated in FIG. 7, after the first transmitting state, the UWB tag enters the receiving state, and the RX of the UWB transceiver is turned on, and the TX of the UWB transceiver is turned off.

3. the UWB transceiver is controlled to be in an off state in response to the UWB tag being in the first sleep state or the second sleep state.

In order to reduce the power consumption of the UWB tag, when the UWB tag transmits a data frame and receives no data frame fed back by the terminal device, the UWB tag enters the first sleep state. After the UWB tag transmits a data frame, receives a data frame fed back by the terminal device, and transmits a data frame again, the UWB tag enters the second sleep state. In the sleep state, the controller controls the UWB transceiver to be in the off state, that is, the UWB tag neither transmits a data frame on the target channel nor receives a data frame on the target channel.

Exemplarily, as illustrated in FIG. 7, after "data frame transmission, data frame reception, and data frame transmission" is completed, the UWB tag enters the second sleep state, and both the RX and the TX of the UWB transceiver are in the off state. When the UWB tag transmits a data frame but receives no data frame, the UWB tag enters the first sleep state, and both the RX and the TX of the UWB transceiver are in the off state.

Correspondingly, determining, by the controller, the second state according to different first states and different state transition events includes the following several possible cases.

1. the receiving state is determined, based on the state transition relationship, as the second state in response to the first state being the first transmitting state and the UWB transceiver completing data frame transmission.

In the first transmitting state, after the UWB tag transmits a data frame on the target channel, in order to determine whether the terminal device has the positioning requirement, the UWB tag needs to enter the receiving state, so as to determine whether a data frame fed back by the terminal device exists on the target channel. Therefore, in the state transition relationship, the state transition event that triggers state transition from the first transmitting state to the receiving state is that data frame transmission is completed.

Exemplarily, as illustrated in FIG. 6, in the first transmitting state, when a data frame is transmitted successfully, the controller determines the receiving state as the second state, thereby controlling the RX of the UWB transceiver to be turned on and to receive, on the target channel, a data frame transmitted by the terminal device.

2. the second transmitting state is determined, based on the state transition relationship, as the second state in response to the first state being the receiving state and the UWB transceiver receiving a data frame transmitted by a terminal device.

In the receiving state, based on different data-frame reception results, the UWB tag is switched to different states, i.e., in the receiving state, second state determined based on different state transition events are different. When the UWB tag receives, in the receiving state, a data frame transmitted by the terminal device, it indicates that the terminal device has the positioning requirement, and the UWB tag needs to transmit a data frame to the terminal device again. Therefore, in the state transition relationship, the state transition event that triggers state transition from the receiving state to the second transmitting state is that the UWB transceiver receives the data frame transmitted by the terminal device.

In a possible implementation, the UWB transceiver feeds back a data frame reception result to the controller, and the controller determines the second state based on the result and the state transition relation.

For example, as illustrated in FIG. 6, in the receiving state, when the UWB transceiver receives the data frame transmitted by the terminal device (i.e., receives successfully), the controller determines the second transmitting state as the second state, thereby controlling the TX of the UWB transceiver to be turned on to implement data frame transmission.

3. the first sleep state is determined, based on the state transition relationship, as the second state in response to the first state being the receiving state and the UWB transceiver receiving no data frame transmitted by the terminal device within a timeout duration.

In the receiving state, if the UWB tag receives no data frame transmitted by the terminal device within the timeout duration, it indicates that the terminal device does not have the positioning requirement. The UWB tag does not need to transmit a data frame to the terminal device again, and the UWB tag needs to enter the first sleep state in order to reduce power consumption. Therefore, in the state transition relationship, the state transition event that triggers state transition from the receiving state to the first sleep state is that the UWB transceiver receives no data frame transmitted by the terminal device within the timeout duration. The timeout duration is a preset fixed duration.

Exemplarily, as illustrated in FIG. 6, in the receiving state, when the UWB transceiver receives no data frame transmitted by the terminal device (i.e., fails to receive), the controller determines the first sleep state as the second state, thereby controlling the UWB transceiver to be turned off, and thus the power consumption of the UWB tag is reduced.

4. the second sleep state is determined, based on the state transition relationship, as the second state in response to the first state being the second transmitting state and the UWB transceiver completing data frame transmission.

In the second transmitting state, after the UWB tag transmits a data frame to the terminal device, the terminal device can determine the distance between the terminal device and the UWB tag based on transmission and reception of the data frame. Furthermore, in order to reduce the power consumption of the UWB tag, after the UWB tag completes data frame transmission, the UWB tag enters the sleep state. Therefore, in the state transition relationship, the state transition event that triggers state transition from the second transmitting state to the second sleep state is that data frame transmission is completed.

Exemplarily, as illustrated in FIG. 6, in the second transmitting state, after the UWB transceiver completes data frame transmission (i.e., transmits successfully), the controller determines the second sleep state as the second state, thereby controlling the UWB transceiver to be turned off, and thus the power consumption of the UWB tag is reduced.

5. the first transmitting state is determined, based on the state transition relationship, as the second state in response to the first state being the first sleep state and a first sleep duration being reached.

In order to avoid that a terminal device with the positioning requirement cannot locate based on a data frame because the UWB tag stays in the sleep state for a long time, after the UWB tag enters the first sleep state, the UWB tag is periodically woken up and transmits a data frame again, to determine whether a terminal device with the positioning requirement exists. Therefore, in the state transition relationship, the state transition event that triggers state transition from the first sleep state to the first transmitting state is that the first sleep duration is reached. The first sleep duration may be a preset fixed duration, or an increasing dynamic duration (with an upper limit).

Optionally, when the UWB tag enters the first sleep state, it indicates that a terminal device with the positioning requirement does not exist, and therefore, the first sleep duration may be set as a relatively long duration, so as to further reduce the power consumption of the UWB tag.

Exemplarily, as illustrated in FIG. 6, in the first sleep state, when the controller receives a time up instruction transmitted by a timer (a timing duration of the timer is the first sleep duration), the controller determines the first transmitting state as the second state, thereby controlling the TX of the UWB transceiver to be turned on, to implement data frame transmission.

6. the first transmitting state is determined, based on the state transition relationship, as the second state in response to the first state being the second sleep state and a second sleep duration being reached, where the first sleep duration is greater than the second sleep duration.

In the second sleep state, a terminal device with a positioning requirement exists, and therefore, in order to make the terminal device perform next ranging as soon as possible, the state transition event that triggers state transition from the second sleep state to the first transmitting state is that the second sleep duration is reached, and the second sleep duration is less than the first sleep duration. For example, the first sleep duration is 900 ms, and the second sleep duration is 40 ms.

Exemplarily, as illustrated in FIG. 6, in the second sleep state, when the controller receives a time up instruction transmitted by the timer (a timing duration of the timer is the second sleep duration), the controller determines the first transmitting state as the second state, thereby controlling the TX of the UWB transceiver to be turned on, to implement data frame transmission.

Figure 8:
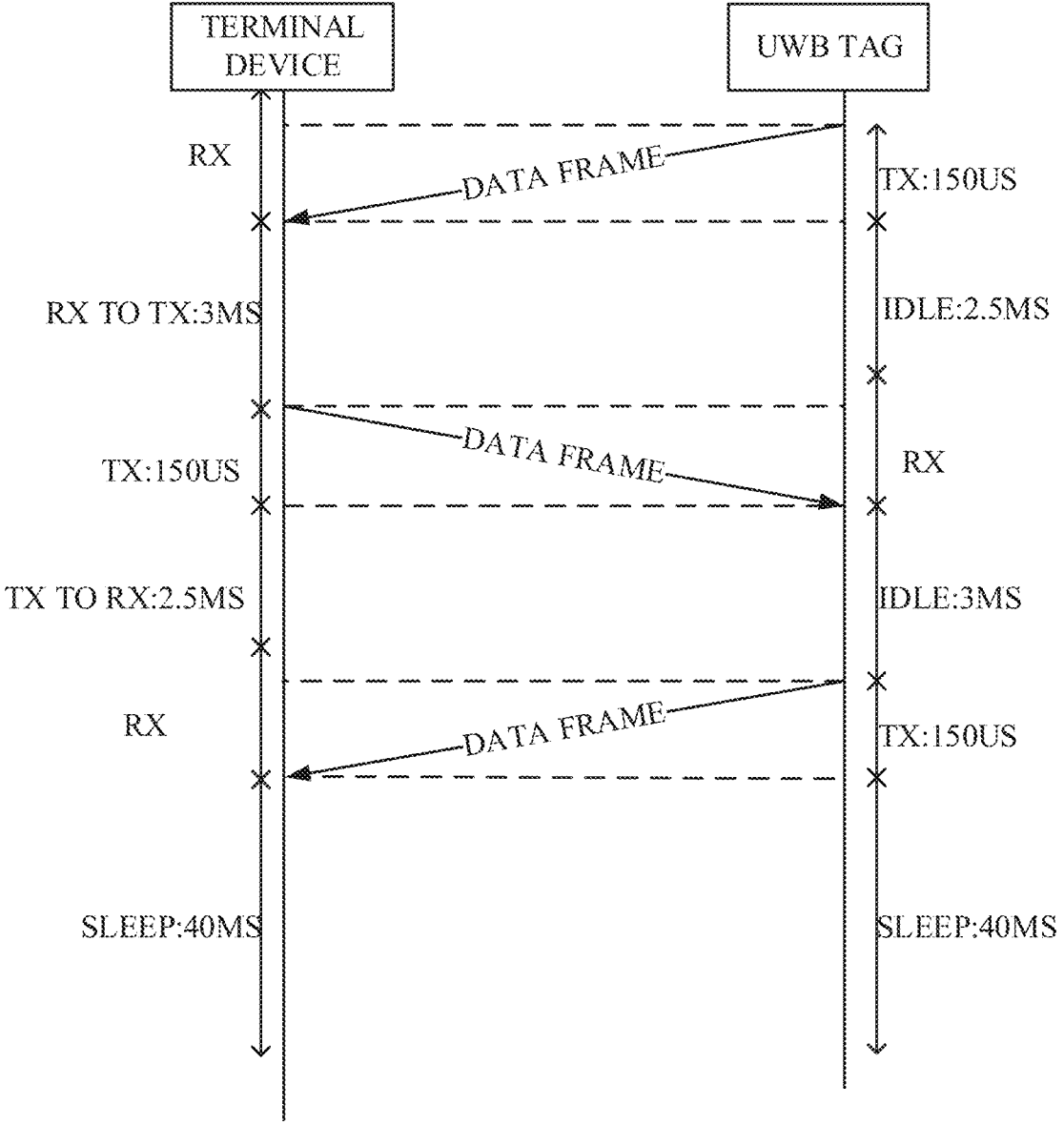
FIGS. 8 and 9 are timing diagrams illustrating an interaction between a terminal device and a UWB tag in different situations.

In some implementations, the UWB tag enters states periodically whether a terminal device with the positioning requirement exists or not. As illustrated in FIG. 8, when a terminal device with the positioning requirement exists, the UWB tag first transmits a data frame on the target channel by means of the TX (consuming 150 us), and turns on the RX (earlier than that the terminal device turns on the TX)

after an idle period (2.5 ms). After the terminal device receives the data frame by means of the RX, the terminal device switches the RX to the TX (consuming 3 ms), turns on the TX, and feeds back a data frame to the UWB tag by means of the TX (consuming 150 us). After the terminal device feeds back the data frame, the terminal device switches the TX to the RX (consuming 2.5 ms, and earlier than that the UWB tag turns on the TX). After the UWB tag receives the data frame fed back, the UWB tag turns on the TX after an idle period (3 ms), and transmits a data frame to the terminal device (consuming 150 us), and the terminal device receives the data frame by means of the RX. After the UWB tag completes data frame transmission, the UWB tag enters a sleep state (40 ms) to wait for being woken up for measurement next time, and after the terminal device receives the data frame, the terminal device enters a sleep state (40 ms) to wait for being woken up for measurement next time.

Figure 9:
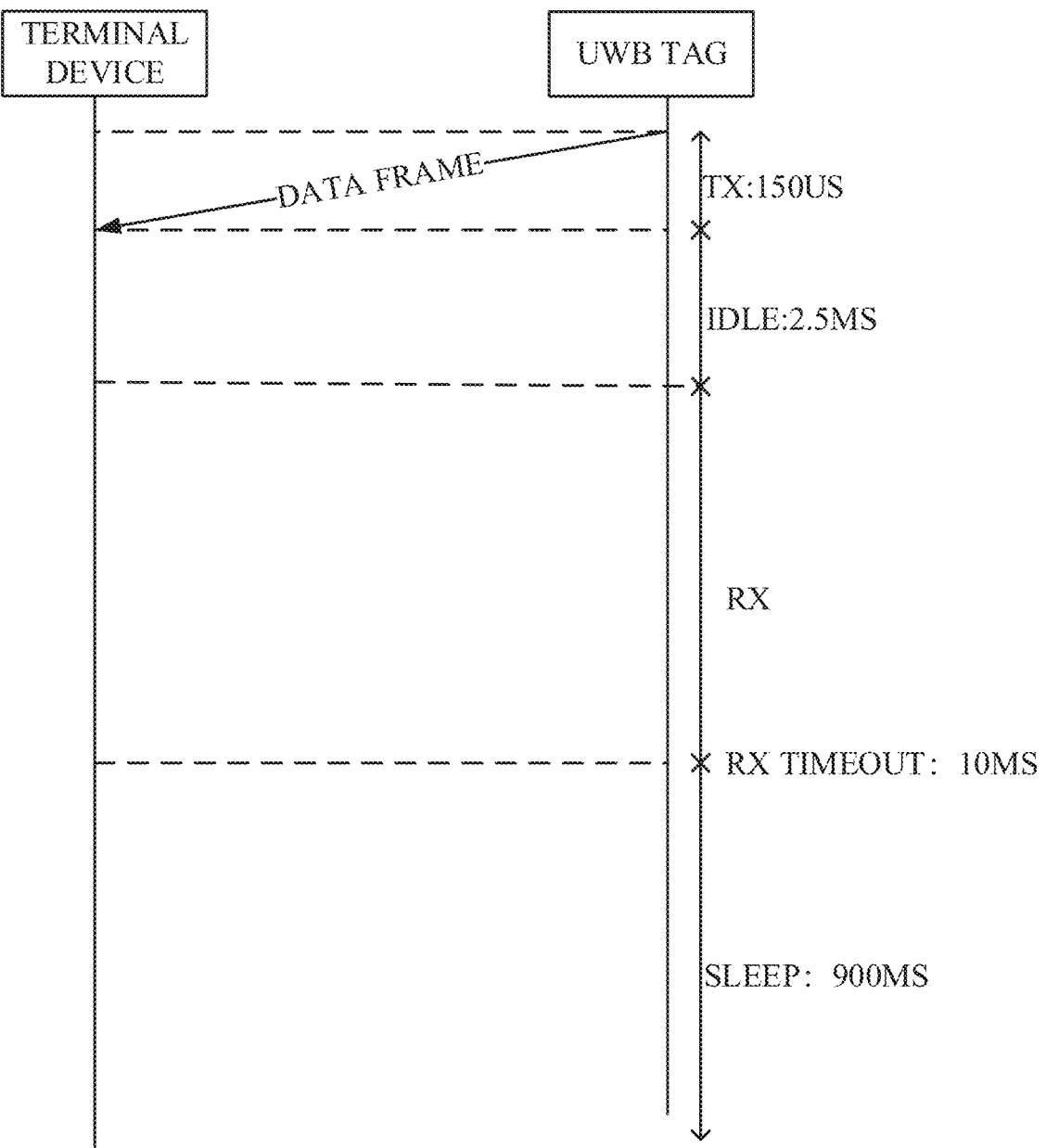

As illustrated in FIG. 9, when a terminal device with the positioning requirement does not exist, the UWB tag first transmits a data frame on the target channel by means of the TX (consuming 150 us), and the UWB tag turns on the RX (earlier than that the terminal device turns on the TX) after an idle period (2.5 ms). When the UWB tag receives, within the timeout duration (timeout: 10 ms), no data frame fed back by the terminal device, the UWB tag enters the sleep state (900 ms), and waits for being woken up next time for transmitting a data frame again.

In a possible design, when the FSM is used as the controller, in order to realize the object positioning function described, a register of the FSM needs to store a necessary parameter. In a possible implementation, a memory provided in the FSM includes a fifth register, a sixth register, a seventh register, an eighth register, a ninth register, and a tenth register.

1. The fifth register is configured to store the first sleep duration.

The FSM reads the first sleep duration stored in the fifth register, and when a duration that the UWB tag is in the first sleep state reaches the first sleep duration, the FSM switches the UWB tag to the first transmitting state, to determine whether a terminal device with the positioning requirement exists. The first sleep duration may be 900 ms, which is not limited in the implementations.

2. The sixth register is configured to store the second sleep duration.

The FSM reads the second sleep duration stored in the sixth register, and when a duration that the UWB tag is in the second sleep state reaches the second sleep duration, the FSM switches the UWB tag to the first transmitting state, so that the terminal device can perform next ranging. The second sleep duration may be 40 ms (less than the first sleep duration), which is not limited in the implementations.

3. The seventh register is configured to store a first idle duration that is a duration required for the terminal device to switch a RX to a TX under the first transmitting state.

After the terminal device receives a data frame by means of the RX, the terminal device needs to feed back a data frame by means of the TX, and it takes a period for the terminal device to switch the RX to the TX. Therefore, after the UWB tag completes data frame transmission, the UWB tag needs to wait for the first idle duration (switches to the RX before the terminal device). During the first idle duration, the UWB tag also switches the TX to the RX. As illustrated in FIG. 8, the first idle duration is 2.5 ms.

4. The eighth register is configured to store a second idle duration that is a duration required for the terminal device to switch the transmitter to the receiver under the receiving state.

After the terminal device feeds back a data frame by means of the TX, the terminal device needs to receive, by means of the RX, a data frame transmitted again by the UWB tag, and it takes a period for the terminal device to switch the TX to the RX. Therefore, after the UWB tag receives the data frame transmitted by the terminal device, the UWB tag needs to wait for the second idle duration (ensuring that the terminal device switches to the RX earlier). In the second idle duration, the UWB tag also switches the RX to the TX. As illustrated in FIG. 8, the second idle duration is 3 ms.

5. The ninth register is configured to store the timeout duration.

Optionally, in the first transmitting state, after the UWB tag completes data frame transmission, the FSM reads the timeout duration stored in the ninth register. The UWB tag enters the first sleep state if the UWB tag receives, within the timeout duration, no data frame fed back by the terminal device. The timeout duration may be 10 ms, which is not limited in the implementations.

6. The tenth register is configured to store a transceiver parameter, where the transceiver parameter includes at least one of a target channel, a rate, or a data frame format.

The transceiver parameter includes a TX parameter and an RX parameter, and is used to indicate the target channel on which a data frame is received/transmitted, the rate for transmitting a data frame on the target channel, and the frame format of the data frame transmitted.

In the implementations, the controller controls the transceiving state of the UWB transceiver, so that the UWB tag can perform data frame exchange multiple times with a terminal device having the positioning requirement, and thus the terminal device can locate the UWB tag based on the data frame exchanged, which is conductive to reducing power consumption of the UWB tag.

Figure 10:
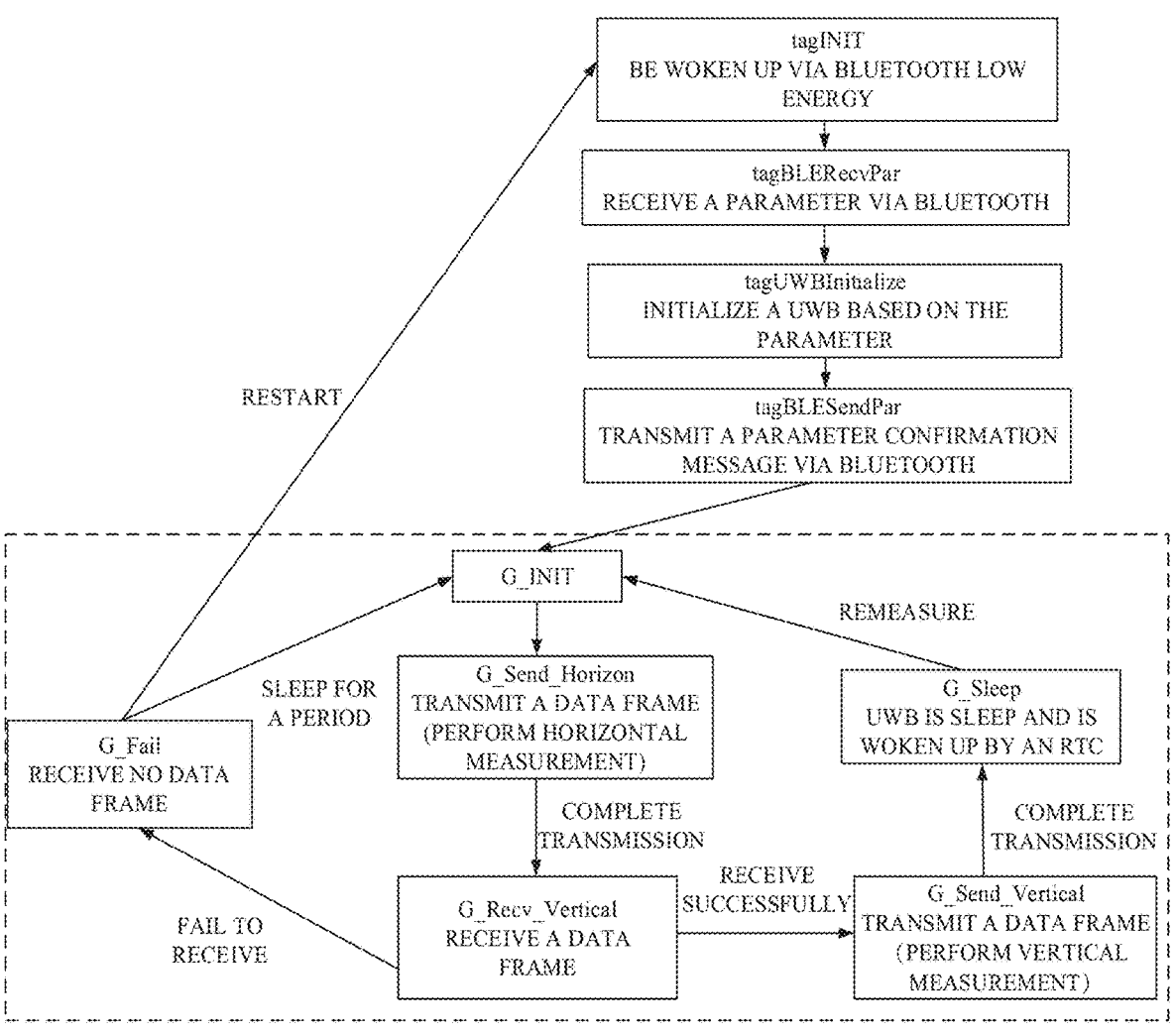
FIG. 10 is a schematic diagram illustrating an operation process of a UWB tag provided in an exemplary implementation of the disclosure.

In a possible implementation, the UWB tag is further provided with a Bluetooth component. Before implementing object positioning, the terminal device firstly configures parameters for the UWB tag via Bluetooth. After parameter configuration is completed, the UWB tag enters a periodical operation state. Exemplarily, as illustrated in FIG. 10, the UWB tag is woken up via Bluetooth low energy (BLE) (tagINIT), and receives, via Bluetooth, a parameter transmitted by the terminal device (tagBLERecvPar), and is initialized based on a parameter (tagUWBInitialize). After the initialization is completed, the UWB tag transmits a parameter confirmation message to the terminal device via Bluetooth (tagBLESendPar), to inform the terminal device to complete initialization.

In the operation state (G_INIT), the UWB tag transmits a data frame on the target channel (G_Send_Horizon), and after the terminal device receives the data frame, the terminal device performs horizontal measurement. When the UWB tag receives a data frame fed back by the terminal device (G_Recv_Vertical), the UWB tag transmits a data frame again (G_Send_Vertical), so that the terminal device performs vertical measurement based on the data frame. After the UWB tag completes data frame transmission, the UWB tag enters the sleep state (G_Sleep), and the UWB tag is woken up by a realtime clock (RTC) for next ranging and angle measurement. When the UWB tag receives no data frame fed back by the terminal device (G_Fail), the UWB tag transmits a data frame again after a period of sleep.

When the UWB tag receives no data frame fed back by the terminal device, and the UWB tag is restarted, parameters of the UWB tag are initialized via Bluetooth.

In the foregoing implementations, the UWB tag with only a single function is taken as an example for illustration. In a possible implementation, the UWB tag may have multiple functions, such that a user can transfer a function of the UWB tag according to requirements, and different operation modes correspond to different target-state sets.

In a possible implementation, the UWB tag is provided with at least two FSMs, different FSMs correspond to different operation modes of the UWB tag (to realize different functions), and different FSMs correspond to different finite state sets. When an operation mode is switched, an FSM is switched.

In another possible implementation, the UWB tag is provided with an MCU and at least two operation procedures, where different control procedures correspond to different operation modes. When an operation mode is switched, an operation procedure read by the MCU is switched.

Correspondingly, before the UWB tag enters the operation state, the UWB tag performs operation-mode switching in response to an operation-mode switching instruction. The operation-mode switching instruction is triggered through a physical key on the UWB tag.

For example, when the UWB tag is provided with an operation-mode switching key, the user may trigger operation-mode switching of the UWB tag by pressing the switching key. When the switching key is pressed, a general-purpose input/output (GPIO) port is pulled down, a first FSM is turned on, and the UWB tag is in a first operation mode. When the switching key is pressed again, the GPIO port is pulled up, a second FSM is turned on, and the UWB tag is in a second operation mode.

In a possible implementation, the UWB tag has the first operation mode and the second operation mode. Under the first operation mode, the UWB tag periodically transmits a data frame, to make a terminal device determine, according to the data frame, an IoT device represented by the UWB tag, and control the IoT device (to realize the spatial awareness function). Under the second operation mode, the UWB tag exchanges a data frame with the terminal device, to make the terminal device determine a distance and an angle between the terminal device and the UWB tag according to the data frame exchanged (to realize the object positioning function). Reference of specific implementation methods can be made to the above implementations, and which will not be described in detail in this implementation herein.

The followings are apparatus implementations of the disclosure, which may be used to execute method implementations of the disclosure. For details not disclosed in the apparatus implementations of the disclosure, reference may be made to the method implementations of the disclosure.

Figure 11:
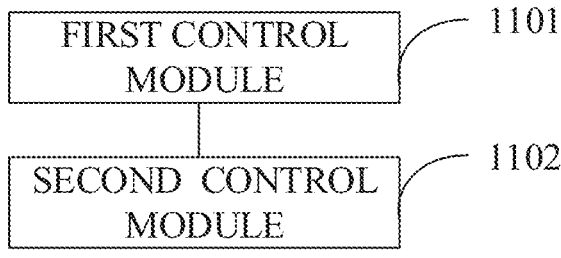
FIG. 11 is a structural block diagram of an apparatus for operation of a UWB tag provided in an implementation of the disclosure.

Referring to FIG. 11, FIG. 11 is a structural block diagram of an apparatus for operation of a UWB tag provided in an implementation of the disclosure. The apparatus has a function implemented by the UWB tag in the method implementations described, and the function can be implemented by hardware, and can also be implemented by hardware executing corresponding software. As illustrated in FIG. 11, the apparatus may include a first control module 1101 and a second control module 1102.

The first control module 1101 is configured to control a UWB transceiver to be in a first transceiving state in response to the UWB tag being in a first state, where the first state belongs to a target-state set.

The second control module 1102 is configured to switch the UWB tag to a second state from the first state and control the UWB transceiver to be in a second transceiving state in response to a state transition event, where the second state belongs to the target-state set.

Optionally, the second control module 1102 is configured to: determine, based on the first state and a state transition relationship, the second state corresponding to the state transition event in response to the state transition event, where the state transition relationship is used to represent a transition relationship between states in the target-state set; and switch the UWB tag to the second state from the first state.

Optionally, the target-state set includes a sleep state, a transmitting state, a waiting state, and a listening state, and the first control module is configured to: control the UWB transceiver to be in an off state in response to the UWB tag being in the sleep state or the waiting state; control the UWB transceiver to be in a transmission-enabled state in response to the UWB tag being in the transmitting state; or control the UWB transceiver to be in a reception-enabled state in response to the UWB tag being in the listening state.

Optionally, the second control module 1102 is specifically configured to: determine, based on the state transition relationship, the listening state as the second state in response to the first state being the sleep state and a sleep duration being reached; determine, based on the state transition relationship, the sleep state as the second state in response to the first state being the transmitting state and the UWB transceiver completing data frame transmission; determine, based on the state transition relationship, the listening state as the second state in response to the first state being the waiting state and a waiting duration being reached; determine, based on the state transition relationship, the transmitting state as the second state in response to the first state being the listening state and a target channel being idle within a listening duration; or determine, based on the state transition relationship, the waiting state as the second state in response to the first state being the listening state and the target channel being occupied within the listening duration.

Optionally, the UWB transceiver is controlled by an FSM, the target-state set is a finite state set corresponding to the FSM, and the FSM is consisted of a register and a combinational logic circuit. The register includes: a first register configured to store the sleep duration; a second register configured to store the listening duration; a third register configured to store a waiting unit duration, where the waiting duration is determined through a random number generated by the combinational logic circuit and the waiting unit duration; and a fourth register configured to store a transceiver parameter, where the transceiver parameter includes at least one of the target channel, a rate, or a data frame format.

Optionally, the target-state set includes a first transmitting state, a receiving state, a second transmitting state, a first sleep state, and a second sleep state. The first control module 1101 is configured to: control the UWB transceiver to be in a transmission-enabled state in response to the UWB tag being in the first transmitting state or the second transmitting state; control the UWB transceiver to be in a reception-enabled state in response to the UWB tag being in the receiving state; or control the UWB transceiver to be in an off state in response to the UWB tag being in the first sleep state or the second sleep state.

Optionally, the second control module 1102 is specifically configured to: determine, based on the state transition relationship, the receiving state as the second state in response to the first state being the first transmitting state and the UWB transceiver completing data frame transmission; determine, based on the state transition relationship, the second transmitting state as the second state in response to the first state being the receiving state and the UWB transceiver receiving a data frame transmitted by a terminal device; determine, based on the state transition relationship, the first sleep state as the second state in response to the first state being the receiving state and the UWB transceiver receiving no data frame transmitted by the terminal device within a timeout duration; determine, based on the state transition relationship, the second sleep state as the second state in response to the first state being the second transmitting state and the UWB transceiver completing data frame transmission; determine, based on the state transition relationship, the first transmitting state as the second state in response to the first state being the first sleep state and a first sleep duration being reached; or determine, based on the state transition relationship, the first transmitting state as the second state in response to the first state being the second sleep state and a second sleep duration being reached, where the first sleep duration is greater than the second sleep duration.

Optionally, the UWB transceiver is controlled by an FSM, the target-state set is a finite state set corresponding to the FSM, and the FSM is consisted of a register and a combinational logic circuit. The register includes: a fifth register configured to store the first sleep duration; a sixth register configured to store the second sleep duration; a seventh register configured to store a first idle duration that is a duration required for the terminal device to switch a receiver to a transmitter under the first transmitting state; an eighth register configured to store a second idle duration that is a duration required for the terminal device to switch the transmitter to the receiver under the receiving state; a ninth register configured to store the timeout duration; a tenth register configured to store a transceiver parameter, where the transceiver parameter includes at least one of a target channel, a rate, or a data frame format.

Optionally, the UWB transceiver is controlled by an MCU or an FSM.

Optionally, the UWB tag has at least two operation modes, and different operation modes correspond to different target-state sets. The apparatus further includes a mode switching module. The mode switching module is configured to perform operation-mode switching in response to an operation-mode switching instruction, where the operation-mode switching instruction is triggered though a physical key on the UWB tag.

Optionally, the UWB transceiver is controlled by an FSM, and the target-state set is a finite state set corresponding to the FSM. The UWB tag is provided with at least two FSMs, different FSMs correspond to different operation modes of the UWB tag, and different FSMs correspond to different finite state sets. The mode switching module is configured to perform FSM switching in response to the operation-mode switching instruction.

Optionally, the UWB tag has a first operation mode and a second operation mode. Under the first operation mode, the UWB tag periodically transmits a data frame, to make a terminal device determine, according to the data frame, an IoT device represented by the UWB tag, and control the IoT device. Under the second operation mode, the UWB tag exchanges a data frame with the terminal device, to make the terminal device determine a distance and an angle between the terminal device and the UWB tag according to the data frame exchanged.

In conclusion, in the implementations of the disclosure, the UWB tag is provided with the controller, the controller controls the transceiving state of the UWB transceiver based on a state of the UWB tag, and when the state transition event is triggered, the controller switches the state of the UWB tag and adjusts the transceiving state of the UWB transceiver. Since the operation state of the UWB tag is periodic, the controller is configured to control transmission/ reception of the UWB transceiver based on the state and the state transition event. As such, the normal operation of the UWB tag is ensured, and the control flow is simplified, such that the cost and the power consumption of the UWB tag can be reduced, and the service life of the UWB tag can be prolonged.

It should be noted that, when the apparatus provided in the foregoing implementations implements functions, the functional modules may be divided as described in the foregoing example. In actual applications, the functions may be allocated to different functional modules for implementation according to requirements, that is, an internal structure of the apparatus is divided into different functional modules to implement all or part of functions described in the foregoing. In addition, the apparatus and method implementations provided in the foregoing implementations belong to a same concept, and for a specific implementation process thereof, reference may be made to the method implementations, which is not described herein again.

Figure 12:
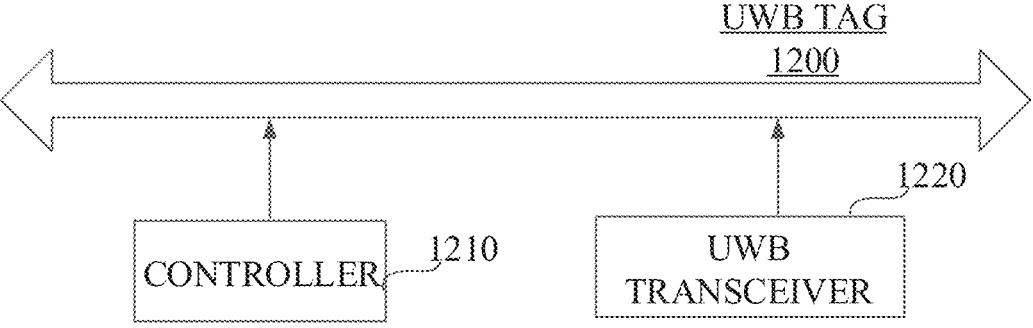
FIG. 12 is a structural block diagram of a UWB tag provided in an exemplary implementation of the disclosure.

Referring to FIG. 12, FIG. 12 is a structural block diagram of a UWB tag provided in an exemplary implementation of the disclosure. A UWB tag 1200 includes at least one controller 1210 and a UWB transceiver 1220. The UWB transceiver 1220 is electrically connected to the controller 1210 and is configured to transmit/receive a data frame on a channel. The controller 1210 is configured to: control the UWB transceiver 1220 to be in a first transceiving state in response to the UWB tag being in a first state, where the first state belongs to a target-state set; and switch the UWB tag 1200 to a second state from the first state in response to a state transition event and control the UWB transceiver 1220 to be in a second transceiving state, where the second state belongs to the target-state set.

Optionally, the controller 1210 is an MCU or an FSM, where the FSM includes at least one register and a combinational logic circuit, so as to realize the described control functions through the register and the combinational logic circuit.

In addition, a person skilled in the art may understand that the structure illustrated in the drawings does not constitute a limitation to the UWB tag, and the UWB tag may include more or fewer components than those illustrated in the drawings, or may combine some components, or may have different component arrangements. For example, the UWB tag may further include a physical key, an indicator light, a power supply, a speaker, a Bluetooth component, or the like, which is not further described in the implementations.

A computer-readable storage medium is further provided in implementations of the disclosure. The computer-readable storage medium stores at least one program code, and the program code is loaded and executed by a controller of a UWB tag to implement the method for operation of the UWB tag in the foregoing implementations.

A computer program product or a computer program is provided according to an aspect of the disclosure. The computer program product or the computer program includes a computer instruction, and the computer instruction is stored in a computer-readable storage medium. A controller of the UWB tag is configured to read the computer instruction from the computer-readable storage medium, and execute the computer instruction, to make the UWB tag implement the method for operation of the UWB tag provided in the optional implementations.

It should be understood that, "multiple" mentioned herein refers to two or more. "and/or" is used to describe an association relationship between associated objects, indicating that three relationships may exist. For example, "A and/or B" may indicate existence of A alone, A and B together, and B alone. The character "/" in the disclosure generally indicates that associated objects are in an "or" relationship. In addition, the numbers of steps described herein merely illustrate one possible execution sequence of the steps. In other implementations, the above steps may also not be executed in the numbered sequence. For example, two steps with different numbers are executed simultaneously, or two steps with different numbers are executed in a sequence reverse to the sequence shown in the drawings, which is not limited in implementations of the disclosure.

The above are only optional implementations of the disclosure and are not intended to limit the disclosure. Any modification, equivalent replacement, improvement, etc., made within the spirit and principles of the disclosure shall fall within the protection scope of the disclosure.

I claim:

1. A method for operation of an ultra wide band (UWB) tag that is provided with a UWB transceiver, comprising:
    controlling the UWB transceiver to be in a first transceiving state in response to the UWB tag being in a first state, wherein the first state belongs to a target-state set; and
    switching the UWB tag to a second state from the first state in response to a state transition event and controlling the UWB transceiver to be in a second transceiving state, wherein the second state belongs to the target-state set;
    wherein the target-state set comprises a sleep state, a transmitting state, a waiting state, and a listening state, and controlling the UWB transceiver to be in the first transceiving state in response to the UWB tag being in the first state comprises one of the following:
        controlling the UWB transceiver to be in an off state in response to the UWB tag being in the sleep state or the waiting state;
        controlling the UWB transceiver to be in a transmission-enabled state in response to the UWB tag being in the transmitting state; and
        controlling the UWB transceiver to be in a reception-enabled state in response to the UWB tag being in the listening state.

2. The method according to claim 1, wherein switching the UWB tag to the second state from the first state in response to the state transition event comprises:
    determining, based on the first state and a state transition relationship, the second state corresponding to the state transition event in response to the state transition event, wherein the state transition relationship is used to represent a transition relationship between states in the target-state set; and
    switching the UWB tag to the second state from the first state.

3. The method according to claim 1, wherein determining, based on the first state and the state transition relationship, the second state corresponding to the state transition event in response to the state transition event comprises one of the following:

determining, based on the state transition relationship, the listening state as the second state in response to the first state being the sleep state and a sleep duration being reached;
determining, based on the state transition relationship, the sleep state as the second state in response to the first state being the transmitting state and the UWB transceiver completing data frame transmission;
determining, based on the state transition relationship, the listening state as the second state in response to the first state being the waiting state and a waiting duration being reached;
determining, based on the state transition relationship, the transmitting state as the second state in response to the first state being the listening state and a target channel being idle within a listening duration; and
determining, based on the state transition relationship, the waiting state as the second state in response to the first state being the listening state and the target channel being occupied within the listening duration.

4. The method according to claim 3, wherein the UWB transceiver is controlled by a finite state machine (FSM), the target-state set is a finite state set corresponding to the FSM, and the FSM is consisted of a register and a combinational logic circuit, wherein the register comprises:
    a first register configured to store the sleep duration;
    a second register configured to store the listening duration;
    a third register configured to store a waiting unit duration, wherein the waiting duration is determined through a random number generated by the combinational logic circuit and the waiting unit duration; and
    a fourth register configured to store a transceiver parameter, wherein the transceiver parameter comprises at least one of the target channel, a rate, or a data frame format.

5. The method according to claim 2, wherein the target-state set further comprises a first transmitting state, a receiving state, a second transmitting state, a first sleep state, and a second sleep state, and controlling the UWB transceiver to be in the first transceiving state in response to the UWB tag being in the first state further comprises one of the following:
    controlling the UWB transceiver to be in a transmission-enabled state in response to the UWB tag being in the first transmitting state or the second transmitting state;
    controlling the UWB transceiver to be in a reception-enabled state in response to the UWB tag being in the receiving state; and
    controlling the UWB transceiver to be in an off state in response to the UWB tag being in the first sleep state or the second sleep state.

6. The method according to claim 5, wherein determining, based on the first state and the state transition relationship, the second state corresponding to the state transition event in response to the state transition event comprises one of the following:
    determining, based on the state transition relationship, the receiving state as the second state in response to the first state being the first transmitting state and the UWB transceiver completing data frame transmission;
    determining, based on the state transition relationship, the second transmitting state as the second state in response to the first state being the receiving state and the UWB transceiver receiving a data frame transmitted by a terminal device;

determining, based on the state transition relationship, the first sleep state as the second state in response to the first state being the receiving state and the UWB transceiver receiving no data frame transmitted by the terminal device within a timeout duration;

determining, based on the state transition relationship, the second sleep state as the second state in response to the first state being the second transmitting state and the UWB transceiver completing data frame transmission;

determining, based on the state transition relationship, the first transmitting state as the second state in response to the first state being the first sleep state and a first sleep duration being reached; and determining, based on the state transition relationship, the first transmitting state as the second state in response to the first state being the second sleep state and a second sleep duration being reached, wherein the first sleep duration is greater than the second sleep duration.

7. The method according to claim 6, wherein the UWB transceiver is controlled by an FSM, the target-state set is a finite state set corresponding to the FSM, and the FSM is consisted of a register and a combinational logic circuit, wherein the register comprises:

a fifth register configured to store the first sleep duration;

a sixth register configured to store the second sleep duration;

a seventh register configured to store a first idle duration that is a duration required for the terminal device to switch a receiver to a transmitter under the first transmitting state;

an eighth register configured to store a second idle duration that is a duration required for the terminal device to switch the transmitter to the receiver under the receiving state;

a ninth register configured to store the timeout duration; and a tenth register configured to store a transceiver parameter, wherein the transceiver parameter comprises at least one of a target channel, a rate, or a data frame format.

8. The method according to claim 1, wherein the UWB transceiver is controlled by a micro controller unit (MCU) or an FSM.

9. The method according to claim 1, wherein the UWB tag has at least two operation modes, different operation modes correspond to different target-state sets, and the method further comprises:

performing operation-mode switching in response to an operation-mode switching instruction, wherein the operation-mode switching instruction is triggered though a physical key on the UWB tag.

10. The method according to claim 9, wherein the UWB transceiver is controlled by an FSM, the target-state set is a finite state set corresponding to the FSM, the UWB tag is provided with at least two FSMs, different FSMs correspond to different operation modes of the UWB tag, different FSMs correspond to different finite state sets, and performing operation-mode switching in response to the operation-mode switching instruction comprises:

performing FSM switching in response to the operation-mode switching instruction.

11. The method according to claim 8, wherein the UWB tag has a first operation mode and a second operation mode, wherein under the first operation mode, the UWB tag periodically transmits a data frame, to make a terminal device determine, according to the data frame, an internet of things (IoT) device represented by the UWB tag, and control the IoT device; and under the second operation mode, the UWB tag exchanges a data frame with the terminal device, to make the terminal device determine a distance and an angle between the terminal device and the UWB tag according to the data frame exchanged.

12. An ultra wide band (UWB) tag comprising a UWB transceiver and a controller, wherein:

the UWB transceiver is electrically connected to the controller;

the UWB transceiver is configured to transmit/receive a data frame on a channel; and the controller is configured to:

control the UWB transceiver to be in a first transceiving state in response to the UWB tag being in a first state, wherein the first state belongs to a target-state set; and switch the UWB tag to a second state from the first state in response to a state transition event and control the UWB transceiver to be in a second transceiving state, wherein the second state belongs to the target-state set;

wherein the target-state set comprises a first transmitting state, a receiving state, a second transmitting state, a first sleep state, and a second sleep state, and in terms of controlling the UWB transceiver to be in the first transceiving state in response to the UWB tag being in the first state, the controller is configured to perform one of the following:

controlling the UWB transceiver to be in a transmission-enabled state in response to the UWB tag being in the first transmitting state or the second transmitting state;

controlling the UWB transceiver to be in a reception-enabled state in response to the UWB tag being in the receiving state; and controlling the UWB transceiver to be in an off state in response to the UWB tag being in the first sleep state or the second sleep state.

13. The UWB tag according to claim 12, wherein the controller is a micro controller unit (MCU) or a finite state machine (FSM).

14. The UWB tag according to claim 12, wherein in terms of switching the UWB tag to the second state from the first state in response to the state transition event, the controller is configured to:

determine, based on the first state and a state transition relationship, the second state corresponding to the state transition event in response to the state transition event, wherein the state transition relationship is used to represent a transition relationship between states in the target-state set; and switch the UWB tag to the second state from the first state.

15. The UWB tag according to claim 14, wherein the target-state set further comprises a sleep state, a transmitting state, a waiting state, and a listening state, and in terms of controlling the UWB transceiver to be in the first transceiving state in response to the UWB tag being in the first state, the controller is further configured to performing one of the following:

controlling the UWB transceiver to be in an off state in response to the UWB tag being in the sleep state or the waiting state;

controlling the UWB transceiver to be in a transmission-enabled state in response to the UWB tag being in the transmitting state; and controlling the UWB transceiver to be in a reception-enabled state in response to the UWB tag being in the listening state.

16. A non-transitory computer-readable storage medium, wherein the computer-readable storage medium stores at least one program code, and the program code is executed by a finite state machine (FSM) to:

control a UWB transceiver to be in a first transceiving state in response to a UWB tag being in a first state, wherein the first state belongs to a target-state set; and switch the UWB tag to a second state from the first state in response to a state transition event and controlling the UWB transceiver to be in a second transceiving state, wherein the second state belongs to the target-state set;

wherein the UWB tag has a first operation mode and a second operation mode, wherein the program code is executed by the FSM to further control the UWB tag to periodically transmit a data frame under the first operation mode, to make a terminal device determine, according to the data frame, an internet of things (IoT) device represented by the UWB tag, and control the IoT device; and the program code is executed by the FSM to further control the UWB tag to exchange a data frame with the terminal device under the second operation mode, to make the terminal device determine a distance and an angle between the terminal device and the UWB tag according to the data frame exchanged.

17. The non-transitory computer-readable storage medium according to claim 16, wherein the UWB tag has at least two operation modes, different operation modes correspond to different target-state sets, and the program code is further executed by the FSM to:

perform operation-mode switching in response to an operation-mode switching instruction, wherein the operation-mode switching instruction is triggered though a physical key on the UWB tag.

18. The non-transitory computer-readable storage medium according to claim 17, wherein the UWB transceiver is controlled by the FSM, the target-state set is a finite state set corresponding to the FSM, the UWB tag is provided with at least two FSMs, different FSMs correspond to different operation modes of the UWB tag, different FSMs correspond to different finite state sets, and in terms of performing operation-mode switching in response to the operation-mode switching instruction, the program code is executed by the FSM to:

perform FSM switching in response to the operation-mode switching instruction.

* * * * *